(12) United States Patent
Hillmann et al.

(10) Patent No.: US 11,967,171 B2
(45) Date of Patent: Apr. 23, 2024

(54) APPARATUS FOR THE DIRECT OPTICAL RECORDING OF SECURITY-RELATED OBJECTS SUCH AS SKIN PRINTS

(71) Applicant: DERMALOG JENETRIC GmbH, Jena (DE)

(72) Inventors: Juergen Hillmann, Jena (DE); Dirk Morgeneier, Jena (DE)

(73) Assignee: DERMALOG JENETRIC GmbH, Jena (DE)

( * ) Notice: Subject to any disclaimer, the term of this patent is extended or adjusted under 35 U.S.C. 154(b) by 0 days.

(21) Appl. No.: 18/336,289

(22) Filed: Jun. 16, 2023

(65) Prior Publication Data

US 2023/0410551 A1   Dec. 21, 2023

(30) Foreign Application Priority Data

Jun. 17, 2022  (DE) .................. 10 2022 115 194.8

(51) Int. Cl.
*G06V 40/13* (2022.01)

(52) U.S. Cl.
CPC ................ *G06V 40/1318* (2022.01)

(58) Field of Classification Search
CPC .............. G06V 10/14; G06V 40/12–1394
See application file for complete search history.

(56) References Cited

U.S. PATENT DOCUMENTS

| | | |
|---|---|---|
| 6,128,399 A | 10/2000 | Calmel |
| 8,487,914 B2 | 7/2013 | Trott |
| 10,108,841 B2 | 10/2018 | Lee et al. |
| 2016/0110025 A1 | 4/2016 | Hossu |
| 2016/0224816 A1* | 8/2016 | Smith ................ G02B 5/208 |
| 2017/0017824 A1 | 1/2017 | Smith et al. |
| 2017/0161543 A1* | 6/2017 | Smith ............. G02F 1/13338 |
| 2017/0169274 A1 | 6/2017 | Sun et al. |
| 2017/0220840 A1 | 8/2017 | Wickboldt et al. |
| 2019/0197290 A1* | 6/2019 | Chen ................ G06V 40/1318 |
| 2019/0251326 A1 | 8/2019 | Sun |

(Continued)

FOREIGN PATENT DOCUMENTS

| | | |
|---|---|---|
| DE | 10 2018 101 625 A1 | 7/2019 |
| DE | 10 2018 122 872 A1 | 3/2020 |

(Continued)

*Primary Examiner* — Premal R Patel
(74) *Attorney, Agent, or Firm* — Christensen, Fonder, Dardi & Herbert PLLC

(57) ABSTRACT

An apparatus for direct optical recording of security-related objects with a series of layers comprising a cover layer with an object placement surface, a sensor layer, a spacer layer with spacer structures for limiting light incident from the placement surface to small incident angles on the sensor layer, and a substrate as carrier of the series of layers. To capture security-related objects with good contrast over a large surface, the sensor pixels have a light-sensitive element and a passage region, and the spacer layer is produced by spacer structures provided on the sensor layer or by spacer structures formed from existing raised-shaped function elements, and the spacer layer comprises cutouts in the region of the entrance aperture of every light-sensitive element, each cutout filled with a medium having a refractive index lower than that of the sensor layer and a layer adjoining in a direction of the placement surface.

11 Claims, 9 Drawing Sheets

(56) References Cited

U.S. PATENT DOCUMENTS

| | | | |
|---|---|---|---|
| 2020/0089984 A1 | 3/2020 | Riehl et al. | |
| 2020/0403024 A1* | 12/2020 | Lin | G06F 18/00 |
| 2021/0004556 A1 | 1/2021 | Reinhold et al. | |
| 2021/0097252 A1* | 4/2021 | Lee | G06V 40/1318 |
| 2021/0286967 A1 | 9/2021 | Hillmann et al. | |

FOREIGN PATENT DOCUMENTS

| | | |
|---|---|---|
| DE | 10 2018 122 917 A1 | 3/2020 |
| EP | 3 008 662 B1 | 8/2018 |
| WO | WO 2017/045130 A1 | 3/2017 |
| WO | WO 2017/063119 A1 | 4/2017 |

* cited by examiner

APPARATUS FOR THE DIRECT OPTICAL RECORDING OF SECURITY-RELATED OBJECTS SUCH AS SKIN PRINTS

PRIORITY CLAIM

The present application claims priority to German Patent Application No. 10 2022 115 194.8, filed on Jun. 17, 2022, which said application is incorporated by reference in its entirety herein.

FIELD OF THE INVENTION

The invention is directed to an apparatus for the direct optical recording of security-related objects, such as at least skin prints, particularly for recording papillary lines of fingerprints or hand prints for identifying persons, skin parts for medical purposes, textiles and foodstuffs, for detecting positions of fingers on displays (e.g., for mobile devices), and optionally for recording documents (for example, passports, driver's licenses and any other credentials such as entry cards, boarding passes, etc.).

BACKGROUND OF THE INVENTION

There are various concepts for recording skin prints for identification purposes. The optical recording of fingerprints is widely used for this purpose.

Depending on the embodiment form of the utilized sensor and the illumination thereof, images can be generated in which either the skin valleys appear bright (FTIR principle) or the skin ridges appear bright (non-FTIR). The angular spectrum of the utilized illumination and the thickness and refractive index of the optical layers which are located between the sensor and the placement surface for the skin region are decisive for image formation.

U.S. Pat. No. 6,128,399 A describes the construction of a fingerprint sensor with a series of layers on the surface of which a finger is placed. The fingerprint sensor disclosed therein comprises a substrate with illumination elements and a cover layer with a placement surface and a two-dimensional matrix of photosensitive elements. Light emitted by the illumination elements passes through transparent gaps between the opaque photosensitive elements to an object or body part to be imaged. The photosensitive elements can only detect light that is not directly emitted by the illumination layer but travels from the direction of the placement surface to the photosensitive elements.

However, the illumination elements can also be arranged between the photosensitive elements as is disclosed in DE 10 2018 122 872 A1, for example. Such layer arrangements are problematic in that, in scanners based on optical TFT technology, the maximum distance between the placement surface and the photosensitive elements or an illumination layer is limited to one half of the pixel spacing (dot pitch). If all kinds of light cones remitted by objects are completely detected by the light-sensitive elements in each instance (without additional steps), this results in a low contrast between skin ridges and skin valleys. According to DE 10 2018 122 872 A1, this can be prevented by sharply limited aperture openings arranged off-center over each sensor element.

There are various approaches for increasing the maximum distance between sensor planes and placement surface. Either the light from the ridges or from the valleys or the direct back-reflection of the illumination on the placement surface can be utilized for imaging.

Imaging through direct back-reflection of the illumination on the placement surface is described in EP 3 008 662 B1. In this case, light coming from the illumination elements is partially reflected at an interface from placement surface to air, i.e., in a skin valley, due to the large difference in the refractive index and is mostly transmitted at an interface from placement surface to skin or skin ridge due to the similarity of the refractive index. Transmitted light is predominantly absorbed by the finger. Therefore, when imaging through direct back-reflection, the skin valleys appear bright and the skin ridges appear dark. However, since the proportion of directly reflected excitation light is very small (approximately 4%), it is suggested to limit the incident angle for increasing the contrast between the skin ridge and skin valley either by providing a microlens in front of each sensor element, or the illumination is active only in stripes in every second row and the sensors are active in the passive row, and there is alternating switching between activation of the illumination pixels and sensor pixels.

Further, in order to increase the contrast of the imaging, there are one or more aperture diaphragms associated with each photosensitive element or sensor pixel in order to limit the incident angle of the light remitted from the placement surface as is described, for example, in WO 2017/045130 A1, WO 2017/063119 A1 and US 2017/0017824 A1.

A further type of angle limiting using diverging elements is disclosed in U.S. Pat. No. 10,108,841 B2. To this end, diverging elements and apertures are arranged above the illumination layer in such a way that the light coming from the placement surface only reaches the photodiodes up to a limited small angle of incidence.

The use of a limited illumination spectrum for increasing contrast is described in DE 10 2018 122 917 A1.

A sandwich-type fingerprint detection device disclosed in US 2017/0169274 A1 has a series of layers comprising a first transparent layer (1-800 μm) as cover layer with a placement surface for placing a finger, an optical filter layer with a plurality of through-holes, a second transparent layer and an optical sensor or a sensor layer. The filter layer is formed at the underside of the cover layer, and the optical sensor is fixedly connected to the filter layer such that the filter layer is arranged between the first transparent layer and the optical sensor. The filter layer is used as a spatial filter which modulates incident light to suppress, split off or reflect obliquely incident components in the light reflected by the fingerprint. The filter layer can be a blocking layer with a plurality of through-holes which allow only very small incident angles to pass to the sensor or contain a reflective layer which reflects large incident angles and accordingly attenuates obliquely incident light and reduces noise. However, the angle limiting can also be achieved with a plurality of hollow columns with opaque filler material between the columns, and only light incident under small angles can pass through the hollow cylinders (with diameter of 2-100 μm) to reach the sensor. While the angular range of the light which can reach the sensor layer proceeding from the placement surface is sharply limited in this way and the contrast of the imaging of a fingerprint is improved as a result of the noise suppression, production of the through-holes in the blocking layer or column layer proves uneconomical.

SUMMARY OF THE INVENTION

Therefore, it is the object of the invention to provide a novel possibility for the direct optical recording of security-related objects, such as at least skin prints, with a series of layers which permits security-related objects to be captured with a uniformly good contrast over a large placement surface without perceptibly impairing the brightness or brilliance of the imaging.

In an apparatus for the direct optical recording of security-related objects, such as at least skin prints, with a series of layers comprising a cover layer with a placement surface for a security-related object, a sensor layer having sensor pixels arranged in a two-dimensional grid, the light-sensitive elements being sensitive only to light coming from the direction of the placement surface, a spacer layer with spacer structures in order to limit light incident from the placement surface to small incident angles on the sensor layer, and a substrate as carrier of the series of layers, the above-stated object is met in that the sensor pixels have in each instance a light-sensitive element and a transparent passage region, the spacer layer is produced by spacer structures which are additionally provided on the sensor layer or by spacer structures formed from existing raised shaped function elements of the sensor layer, a spacer structure is associated with each sensor pixel, and an illumination layer for emitting illumination light which is arranged below a plane of the entrance apertures of the light-sensitive elements of the sensor layer considered from direction of the placement surface.

Security-related elements are skin regions, for example, the impression of a finger, hand prints or footprints, and documents for identifying persons, for example, an ID, a passport, a driver's license, a credit card or a visitor pass.

Incident light from the placement surface is limited to small incident angles on the sensor layer by the spacer layer with the spacer structures in order to increase the contrast of a recording of a security-related object. The light which is remitted by a security-related object after the impingement of the illumination light is referred to as scatter light. Illumination light which is directly reflected at the placement surface of the cover layer is referred to as direct back-reflection. Light which impinges on the placement surface through the security-related object or past the security-related object is referred to as ambient light. According to the invention, ambient light and scatter light impinging on the top surface under a large angle should not be incident on the sensor layer from direction of the placement surface or, if so, only the smallest possible fraction thereof.

According to the invention, the direct back-reflection and the scatter light that is remitted from the skin valleys have a major participation in imaging during the recording of the security-related objects. The incident angle of the illumination light on the placement surface under which direct back-reflection can take place is limited analogous to a critical angle of total internal reflection which depends on a difference in refractive index. The scatter light which is remitted from skin valleys has a greater participation in the imaging because the skin valley forms an air gap whose difference in refractive index relative to the cover layer is greater than the difference in the refractive index of a skin ridge relative to the cover layer. Therefore, scatter light that is remitted from skin valleys is refracted more strongly at the placement surface toward a normal of the placement surface.

The greater the distance between the security-related object and the sensor layer, the greater the participation of the direct back-reflection in the imaging during recording. This is because the remitted light from the skin valleys is remitted in a substantially randomly uniformly distributed manner in all directions, whereas the more illumination light is directly back-reflected, the smaller the incident angle of the illumination light on the placement surface.

Cutouts which are advantageously associated with exactly one light-sensitive element in each instance are located above the sensor layer. These cutouts can be incorporated in various ways and are filled or evacuated with a gas or gas mixture. They can be incorporated above the light-sensitive elements as part of the sensor layer with the help of diaphragm structures, as part of an uneven sensor surface or an uneven underside of the cover layer or as part of the spacer layer. Lastly, the cutouts of the spacer layer can be filled with a material having a lower refractive index than a layer arranged above the spacer layer in direction of the placement surface.

It is important for the invention that all of the light coming from the placement surface that reaches the light-sensitive elements impinges on such a cutout beforehand. In this way, light with incident angles greater than the critical angle of total internal reflection at the interface of a layer that is located above the spacer layer and has a higher refractive index than the medium in the cutout of the spacer layer is totally internally reflected at the interface and therefore prevented from being picked up by the sensors.

The illumination layer is advantageously arranged below the sensor layer seen from direction of the placement surface and has an air layer between the illumination layer and the sensor layer. Accordingly, the angular spectrum of the illumination light can be limited to smaller angular ranges. The air layer between the illumination layer and sensor layer accordingly serves to increase the illumination distance in order to positively influence the imaging through a directed illumination with a substantially perpendicular low-divergence beam profile.

The illumination layer can have illumination elements which can be integrated between the light-sensitive elements in the sensor layer. An apparatus for direct optical recording of security-related objects can be configured more compactly in this way.

The spacer layer can be produced by utilizing existing raised shaped function elements of the sensor layer in that raised shaped function elements, such as, for example, (non-transparent) diode apertures which define the entrance aperture of each light-sensitive element and limit the active surface area thereof, form the spacer structures. Such existing raised shaped function elements may also be electronic structures had by light-sensitive elements on the non-transparent areas thereof for readout thereof. Alternatively, the spacer layer can be produced by means of transparent spacer structures additionally provided on the sensor layer. In this regard, there can be a gas, a gas mixture (e.g., air) or a vacuum located between the transparent structures (at least in the area above each light-sensitive element), or a transparent solid medium with low refractive index ($n \leq 1.4$) can be provided over the full surface area on the sensor layer.

The diode apertures can be realized, for example, through a covering which protrudes over the light-sensitive element in direction of the placement surface or by a stepped covering. A further diode aperture layer can be arranged additionally directly below the sensor layer in order to block the illumination light coming from the illumination layer and limit an angular range of the illumination light. The diode apertures are constructed from a non-transparent material. For example, a metal, such as, e.g., molybdenum, copper, silver, gold, or an alloy can be used for the diode apertures. It is advantageous when every diode aperture covers the light-sensitive element on which it is arranged with respect to lateral incidence.

By "entrance aperture" is meant a region through which light can be incident in a sensor pixel. For example, the entrance apertures can be transparent regions of the diode apertures.

In a particularly advantageous manner, the diode apertures are configured such that they cover an area of each light-sensitive element. The area of each light-sensitive element not covered by the diode aperture is preferably between 20 µm$^2$ and 150 µm$^2$ and every diode aperture is formed circumferentially around the area not covered by the diode aperture. Each diode aperture preferably has a height of more than 2 but at least 600 nm, in order to serve as spacer structure.

The spacer layer is advisably filled with a gas or a gas mixture in cutouts between the spacer structures. However, the cutouts can also be evacuated. The cutouts of the spacer layer are preferably filled with a gas mixture which is advisably air. Similarly, the spacer layer can advantageously be filled with at least one gas, such as nitrogen, argon, helium or other inert gases. The cutouts can also be filled with magnesium fluoride or calcium fluoride or low-index optically clear adhesives (OCAs), e.g., NOA1315 or NOA133.

An additional filter layer can be provided between the placement surface and the sensor layer in order to filter out ambient light reaching the placement surface through the security-related object and/or past the security-related object. As a result of the filtering, the ambient light cannot impinge on the sensor layer. The filter layer preferably has a spectral filter, particularly preferably a low pass filter or band pass filter.

The connection of the cover layer to the sensor which is formed at least of the substrate and sensor layer can be produced by vacuum bonding. The connection of the cover layer to the sensor can also be produced with an adhesive frame through so-called air gap bonding. In so doing, air (or another gas or gas mixture) remains between the cover layer and the sensor. Alternatively, the connection of the cover layer to the sensor can be produced by means of an adhesive layer with a very low refractive index (≤1.4).

By means of vacuum bonding, the sensor and cover layer are permanently connected to one another, and the sensor is simultaneously protected against environmental influences such as moisture. To this end, the cover layer is placed on the sensor, the layer between the cover layer and the sensor is evacuated, and the cover layer is preferably fixed only at the edge in an area having no light-sensitive elements by means of the ambient pressure opposed to the negative pressure in the layer between the cover layer and the sensor. By means of an adhesive frame around the outer edges of the cover layer and sensor, the cover layer fixed in this way is hermetically sealed at the edge.

A particular advantage of layers connected by vacuum bonding consists in that they can be removed again and reused. An adhesive frame or an adhesive layer is preferably detachable by means of heat. Accordingly, placement surfaces or cover layers which have been scratched through use can be replaced. This is advantageous for cost-related and resource-related reasons. Further, the cover layer is additionally fixed by an existing negative pressure between the sensor layer and cover layer.

Alternatively, the cover layer can be fixed on the sensor by means of the adhesive layer. The adhesive frame or the adhesive layer can be made from OCA or liquid adhesive and located between the sensor and the cover layer. A thickness of the adhesive frame or of the adhesive layer is advantageously 3 to 50 µm.

BRIEF DESCRIPTION OF THE DRAWINGS

The invention will be described more fully in the following through embodiment examples referring to drawings. The drawings show.

DETAILED DESCRIPTION

Figure 1A:
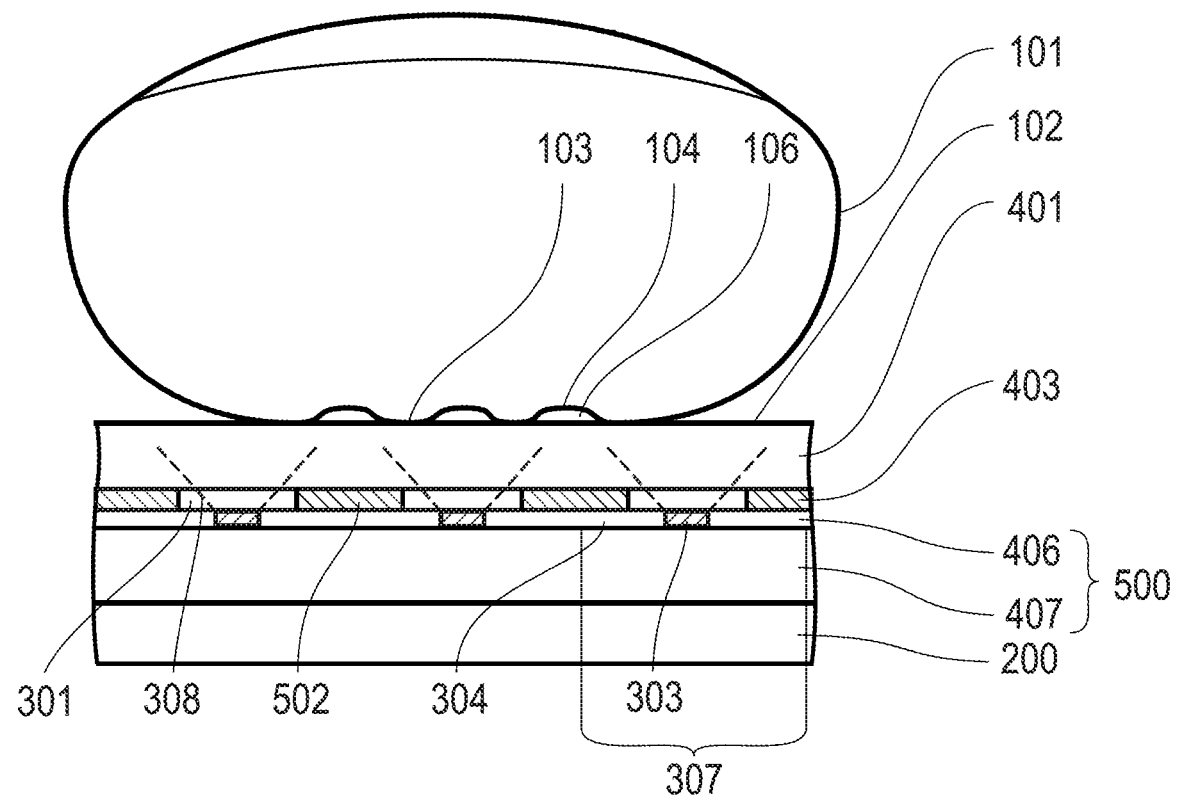
FIG. 1a a sectional view of a first embodiment of the apparatus according to the invention for the direct optical recording of security-related objects with a finger as security-related object.

FIG. 1a shows a first embodiment of an apparatus for the direct optical recording of security-related objects 101. The security-related object 101 depicted is a finger which is placed on a placement surface 102. The placement surface 102 is the upper surface of a cover layer 401.

The apparatus comprises a sensor layer 406 which is arranged below the cover layer 401 viewed in direction of the placement surface 102 and has sensor pixels 307 which are arranged in a two-dimensional grid and have light-sensitive elements 303 which are only sensitive to light coming from direction of the placement surface 102. The sensor pixels 307 have, in each instance, a light-sensitive element 303 and a transparent passage region 304. A substrate 407 serving as a carrier for the series of layers comprising the sensor layer 406, a spacer layer 403 and the cover layer 401 is arranged below the sensor layer 406 viewed from direction of the placement surface 102. Illumination light 201 can be emitted in direction of the placement surface 102 by the illumination layer 200. The apparatus further comprises the spacer layer 403 with spacer structures 502 which are transparent in the embodiment shown in FIG. 1a and FIG. 1b in order to limit light impinging from the surface placement 102 to small incident angles on the sensor layer 406. The spacer layer 403 is arranged between the cover layer 401 and the sensor layer 406 and is formed by spacer structures 502 additionally provided on the sensor layer 406 or by spacer structures 502 formed from existing raised shaped function elements of the sensor layer 406. The spacer layer 403 is arranged between sensor layer 406 and placement surface 102. Each sensor pixel 307 is associated with a spacer structure 502 of the spacer layer 403.

The thickness of the spacer layer 403 in vertical direction, i.e., perpendicular to the layers of the layer stack, preferably amounts to at least 600 nm. Particularly preferably, the thickness of the spacer layer 403 in vertical direction is at least 600 nm and at most 2000 nm.

Security-related objects 101 are skin regions, for example, the impression of a finger, hand prints or footprints, and documents for identifying persons, for example, an ID, a passport, a driver's license, a credit card or a visitor pass. When a document is placed on the placement surface 102, an air gap 106 remains between the placement surface 102 and the security-related object 101. The contrast during the recording of the document is created in that bright areas of the document reflect the illumination light 201 better than dark areas.

The security-related object 101 is shown in FIG. 1a as a finger with a plurality of ridges 103 and valleys 104 which is placed on the placement surface 102. The placement surface 102 is formed by the outer surface of a resistant transparent cover layer 401 on which a plurality of fingers 101 can also be placed simultaneously. The cover layer 401 can be formed, for example, from glass or ceramic. FIG. 1a schematically shows the structure of the sensor layer 406 by reference to three sensor pixels 307 for the optical recording of the placed finger 101. The transparent passage region 304 of the sensor pixels 307 advantageously occupies 10% to 80% of a total sensor pixel area, preferably 10% to 50% and particularly preferably 20% to 40% of the total sensor pixel area.

The substrate 407 forms the foundation for building the layer series of the apparatus for recording security-related objects 101. Conductors, semiconductors and insulators are provided on the substrate 407 by means of photolithographic processes known in the art as TFT (thin film transistor) technology. Alternatively, it is also possible to produce individual layers by means of printing methods, for example, silk screening processes. The substrate 407 is preferably made from a transparent material such as plastic or glass in order to allow illumination light 201 coming from direction of the passage regions 304 of the sensor pixels 307 of the sensor layer 406 to pass through the entire layer series and the placement surface 102 for illuminating the security-related object 101, for example, the finger or the document.

Each sensor pixel 307 has a light-sensitive element 303 for transforming light into electric signals and a transparent passage region 304. The light-sensitive elements 303 are photodiodes which are so constituted that they cannot detect light from below, i.e., from direction of the substrate 407. This is realized via an opaque sensor pixel area 306, for example, a diaphragm comprising a non-transparent material on the underside of the photodiode as is known and customary in the prior art. The light-sensitive elements 303 typically have an opening angle of approximately 180° and are so constituted that they detect light of a given wavelength range from direction of the placement surface 102. The sensor pixels 307 preferably detect a wavelength range in the visible radiation spectrum between 380 nm and 780 nm. To record FBI-compliant images, the sensor layer 406 preferably has a center to center spacing of the light-sensitive elements 303 of ≤50.8 μm, which corresponds to a resolution of 500 ppi (pixel per inch) or more.

Figure 1B:
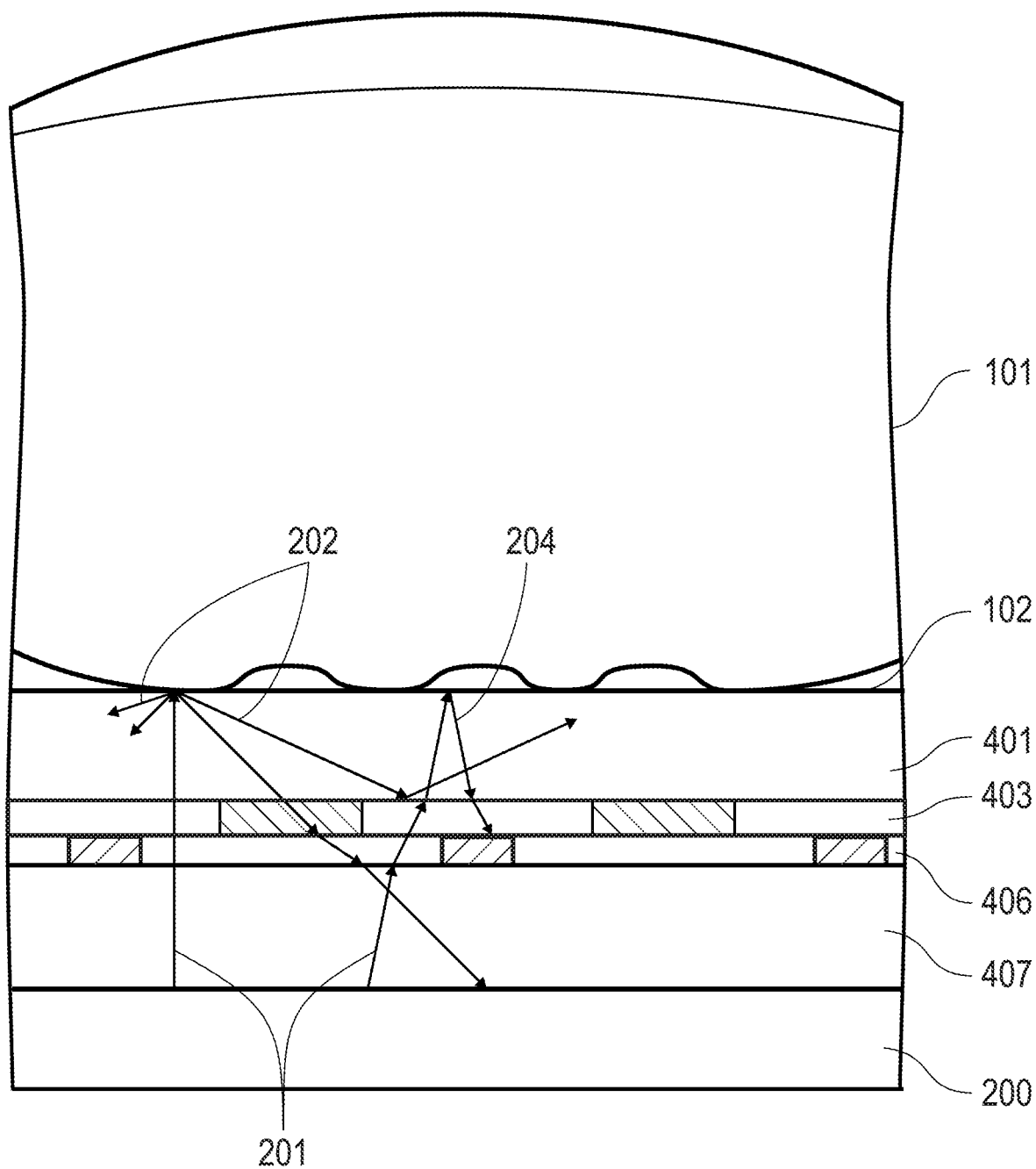
FIG. 1b an enlarged sectional view of the first embodiment of the apparatus according to the invention in FIG. 1a with the finger as security-related object and some exemplary beam paths.

FIG. 1b shows an enlarged view of the same construction of the apparatus according to the invention for the direct optical recording of security-related objects 101 as FIG. 1a with the finger as security-related object.

In FIG. 1b, a possible light path of illumination light 201 is directed, by way of example, from one of the passage regions 304 for illuminating the finger at the underside thereof in direction of the placement surface 102 and, when the security-related object 101, in this case the finger, is placed on the placement surface 102, results in point-by-point transformation into scatter light 202. Illumination light 201 directed in direction of the placement surface 102 enters the cover layer 401 and is refracted due to a difference in the refractive index. The light, or illumination light 201, emitted by the illumination layer 200 is reflected at the cover layer 401 or transmitted through the cover layer 401, reaches the security-related object 101 and is remitted as scatter light 202. However, due to the difference in refractive index between the cover layer 401 and the spacer layer 403, scatter light 202 incident on the spacer layer 403 under a large angle does not reach the light-sensitive elements 303. Total internal reflection takes place at the transition from the cover layer 401 to the spacer layer 403 in the region of the cutouts 301. It can then only be received by a light-sensitive element 303 when the incident angle on the spacer layer 403 is smaller than the angle of total internal reflection.

The angle of total internal reflection depends on the refractive index of the spacer layer 403 and cover layer 401. The spacer layer 403 can be filled or evacuated with a low-index (n≤1.4) solid medium, a gas or a gas mixture. The cover layer 401 must be at least partially transparent to illumination light 201 coming from the illumination layer 200 and is preferably made of glass. When the cover layer 401 is made of glass and the spacer layer 403 is filled with air, the critical angle of total internal reflection is approximately 41°. If the distance between the placement surface 102 and the sensor layer 406 is very large, a material with a higher refractive index (e.g., n≥1.7) can advantageously be used instead of glass in order to increase the critical angle of total internal reflection.

The illumination light 201 is partially reflected at the placement surface 102. This direct back-reflection 204, also known as Fresnel reflection, takes place at the interface of the cover layer 401 and an environment or a security-related object 101, since the cover layer 401 has a greater optical density or refractive index than the environment or surrounding air or than the security-related object 101. Apart from the refractive indices of the cover layer 401 and of the environment or of the security-related object 101, the incident angle of the illumination light 201 on the placement surface 102 also determines whether or not a Fresnel reflection occurs. For perpendicular light incidence, the direct back-reflection component of the illumination light 201 in a glass-air interface is approximately 4%. This means that a large proportion of the illumination light 201 is transmitted through the placement surface 102 and only a small proportion is reflected back as direct back-reflection 204. A limiting angle of the direct back-reflection 204 is equal to the critical angle of the total internal reflection, i.e., for example, approximately 41° for the glass-to-air interface. Therefore, if the direct back-reflection 204 should make a substantial contribution to the recording of security-related objects 101, it is sensible to provide an air layer 408 (shown, inter alia, in FIG. 2a) between sensor 500 and illumination layer 200 in order to limit the angle under which the illumination light 201 is incident on the placement surface 102.

Emission angles of displays or backlight units such as can be utilized for the illumination layer 200 are preferably between 10° and 40°, particularly preferably between 15° and 20°.

The direct back-reflection 204 and the scatter light 202 which is remitted from skin valleys 104, as opposed to the scatter light 202 coming from the skin ridges 103, are preferably detected through the spacer layer 403 and the diode apertures 302. This is because the direct back-reflection 204 has a limiting angle under which illumination light 201 can be directly back-reflected, and the more illumination light 201 is directly back-reflected, the smaller the incident angle of the illumination light 201 at the placement surface 102. The emergent angle of the direct back-reflection 204 is equal to the incident angle of the illumination light 201 on the placement surface 102. Since the difference in refractive index between the air gap 106 under the skin valley 104 and the cover layer 401 is greater than the difference in refractive index between the skin ridge 103 and the cover layer 401, a larger proportion of the illumination light 201 is reflected at the placement surface 102 in such a way that it can impinge on the light-sensitive element of a pixel.

The greater the distance between the security-related object 101 and the sensor layer 406, the greater the proportion of direct back-reflection 204 in the imaging during the recording. This is because the light remitted from the skin is remitted substantially uniformly in all directions, but the more illumination light 201 is directly back-reflected, the smaller the incident angle of the illumination light 201 on the placement surface 102. Because of the effects described above, a directed illumination with a substantially perpendicular beam profile can positively affect the imaging.

Figure 2A:
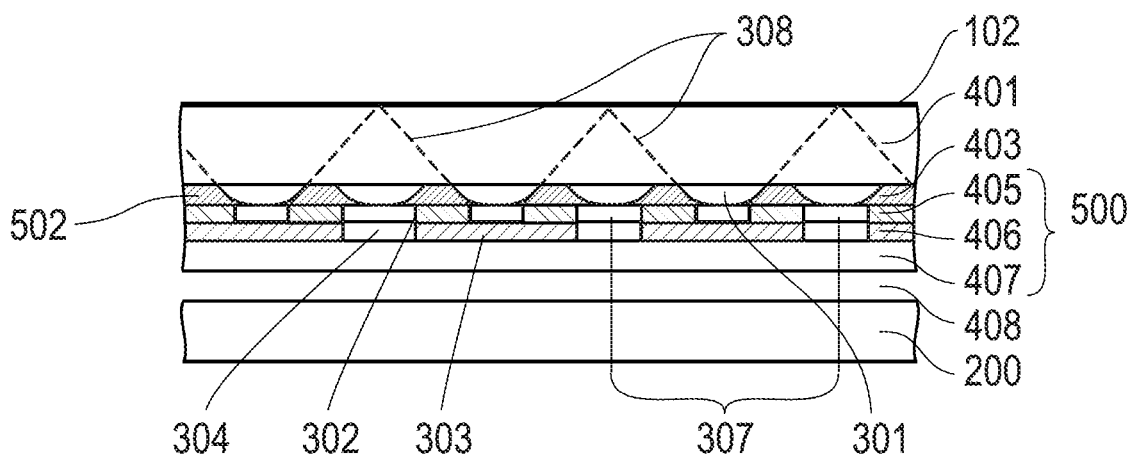
FIG. 2a a sectional view of a second embodiment of the apparatus for the direct optical recording of security-related objects.

The second embodiment of the apparatus for the direct optical recording of security-related objects 101 shown in FIG. 2a comprises a series of layers which includes the cover layer 401 with the placement surface 102, the spacer layer 403 with spacer structures 502, a diode aperture layer 405 with diode apertures 302, the sensor layer 406 with the sensor pixels 307, and the substrate 407. The sensor pixels 307 have in each instance a light-sensitive element 303 and a transparent passage region 304. An air layer 408 is also arranged between the substrate 407 and the illumination layer 200 in the embodiment shown in FIG. 2a. The cutout 301 is produced via an uneven sensor surface in the depicted embodiment example. The surface area of the cutout 301 or the extent of the cutout 301 in horizontal direction should be at least as large as an imaging of the diode aperture 302 in the spacer layer 403 under an angle of total internal reflection which is preferably 41° or <45°.

Located above the sensor layer 406 is a cutout 301 associated with each light-sensitive element 303. This can be incorporated in various ways and filled or evacuated with a gas or a gas mixture. The cutout 301 is part of the spacer layer 403. It can be incorporated above the light-sensitive elements 303 as part of a sensor 500 which comprises the diode aperture layer 405, the sensor layer 406 and the substrate 407 by means of a diode aperture 302, as part of an uneven sensor surface or a cover layer 401 with an uneven underside. The individual variants are described more precisely in the following embodiment examples. It is important that when cutouts 301 are present all of the light which reaches the light-sensitive elements 303 from the placement surface 102 in theory impinges on a cutout 301. Therefore, angles which are greater than the critical angle of total internal reflection are blocked at the transition from one of the layers to the spacer layer 403.

The diode aperture layer 405 is arranged between the spacer layer 403 and the sensor layer 406. A diode aperture 302 is associated with each light-sensitive element 303 and is provided on the light-sensitive element 303. The diode apertures 302 have a dimension in direction of the placement surface 102 and, combined with the cutouts 301, can limit the incident angle of the illumination light 201 from direction of the placement surface 102. The diode apertures 302 serve to achieve an improved resolution because light from a smaller region of the placement surface 102 can reach a light-sensitive element 303 through them. The cutouts 301 are teardrop-shaped in the depicted embodiment example, and the angular range or entrance aperture 308 in which scatter light 202 and the direct back-reflection 204 reach the sensor layer 406 is shown schematically by dashed lines.

Figure 2B:
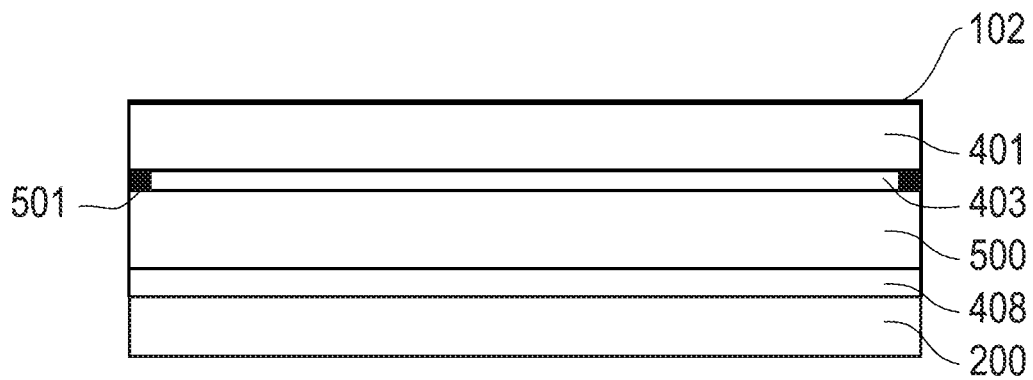
FIG. 2b a sectional view of a third embodiment of the apparatus for the direct optical recording of security-related objects.
Figure 2C:
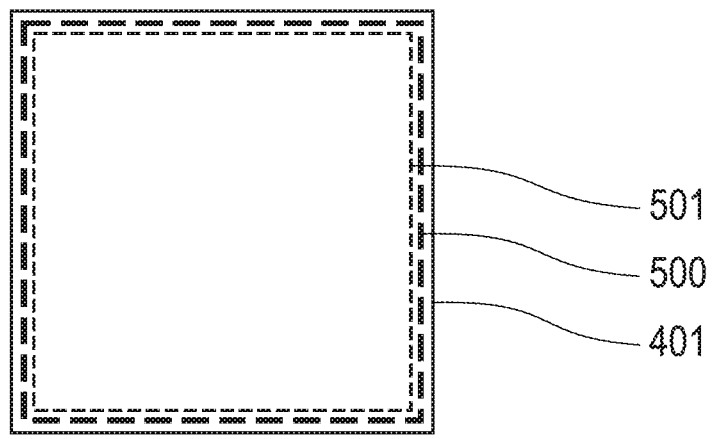
FIG. 2c a top view of the third embodiment of the apparatus according to FIG. 2b.

A third embodiment of the apparatus for the direct optical recording of security-related objects 101 is illustrated in FIG. 2b and FIG. 2c. The apparatus comprises the cover layer 401 with the placement surface 102, a sensor 500 which is arranged below the cover layer 401 viewed from the placement surface 102 and is formed from sensor layer 406 and substrate 407, the spacer layer 403, the air layer 408 and the illumination layer 200. The connection between the cover layer 401 and the sensor 500 is produced through an adhesive frame 501 by means of air gap bonding. The adhesive frame 501 glues the cover layer 401 to the sensor 500. The adhesive frame 501 should not protrude into the area of the sensor layer 406 in which the sensor pixels 307 are arranged. The cover layer 401 is fixed by the adhesive frame 501 and does not move when a security-related object 101 is placed thereon. The use of an adhesive frame 501 for fixing the cover layer 401 is also known as air gap bonding because an air gap is formed in the spacer layer 403 between the cover layer 401 and the sensor 500.

Figure 2D:
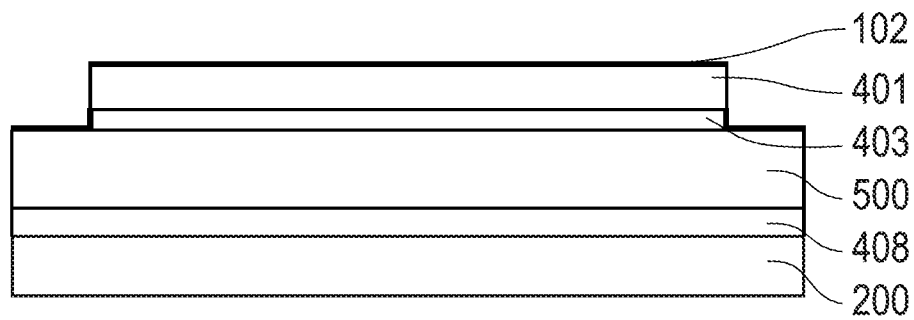
FIG. 2d a sectional view of a fourth embodiment of the apparatus for the direct optical recording of security-related objects.

FIG. 2d shows a fourth embodiment of the apparatus for the direct optical recording of security-related objects 101. In the fourth embodiment, the cover layer 401 is provided on the sensor 500 by means of vacuum bonding. The sensor 500 and cover layer 401 are permanently connected to one another through the vacuum bonding, and the sensor 500 is simultaneously protected against environmental influences such as moisture. A first width of the cover layer 401 is smaller than a second width of the sensor 500. The spacer layer 403 is sealed laterally in order to maintain a pressure inside of the spacer layer 403 that is substantially lower than the ambient pressure.

Figure 2E:
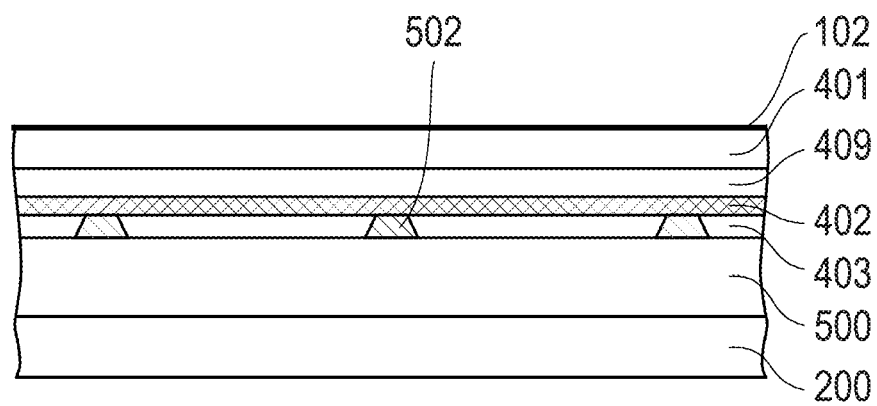
FIG. 2e a sectional view of a fifth embodiment of the apparatus for the direct optical recording of security-related objects.

A fifth embodiment of the apparatus for the direct optical recording of security-related objects 101 is shown in FIG. 2e. The apparatus comprises the cover layer 401 with the placement surface 102, a sensor 500 which is arranged below the cover layer 401 viewed from the placement surface 102 and is formed from sensor layer 406 and substrate 407, the spacer layer 403 with frustoconical spacer structures 502, and the illumination layer 200. The connection between the cover layer 401 and the sensor 500 is produced by means of an adhesive layer 402. In the depicted embodiment, the adhesive layer 402 is formed continuously and must therefore be at least partially transparent to the illumination light 201. Since there is no air layer 408, the apparatus for the direct optical recording of security-related objects 101 is formed more compactly.

The fifth embodiment of the apparatus for the direct optical recording of security-related objects 101 has a filter layer 409 which preferably comprises a spectral filter. The filter layer 409 serves to block ambient light which reaches the placement surface 102 through and/or past the security-related object 101.

Figure 3:
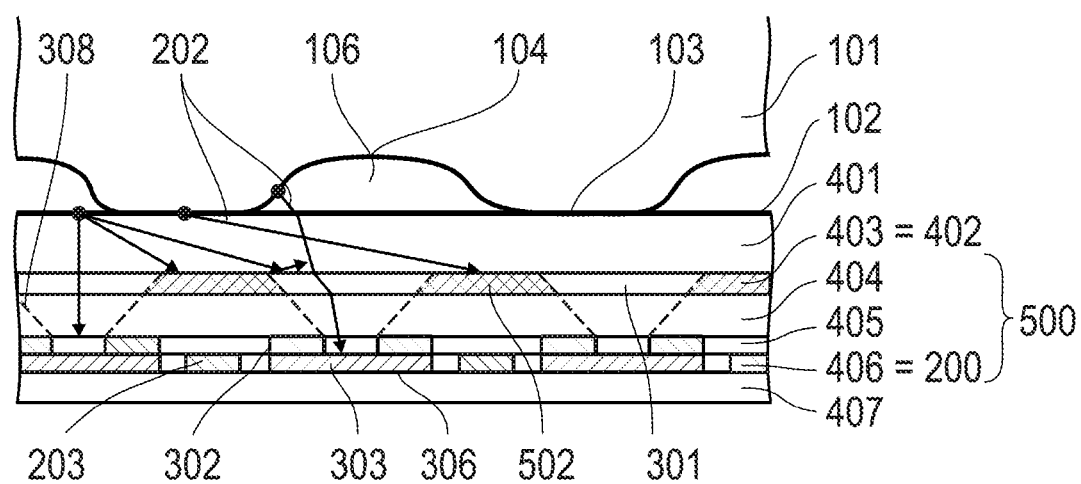
FIG. 3 a sectional view of an advantageous construction of a series of layers of an apparatus for the direct optical recording of security-related objects.

FIG. 3 shows a schematic view of the series of layers of the apparatus for the direct optical recording of security-related objects 101 in a preferred embodiment form. A sensor layer 406 with non-transparent light-sensitive elements 303 is arranged on a substrate 407. A diode aperture 302 is associated with each light-sensitive element 303. The layer series comprises the cover layer 401 with the placement surface 102, the spacer layer 403 with the spacer structures 502, the diode aperture layer 405 with the diode apertures 302, the sensor layer 406 with the sensor pixels 307, the spacer layer 403 with the spacer structures 502, and the substrate 407. The illumination layer 200 has illumination elements 203 which are integrated between the light-sensitive elements 303 in the sensor layer 406. The illumination layer 200 and the sensor layer 406 are accordingly combined in one layer. A passivation layer 404 which serves to protect the sensor layer 406 from external influences is additionally provided in the series of layers shown in FIG. 3. In this instance, the passivation layer 500 is a component part of the sensor 500. The passivation layer 404 can be formed from an organic material (e.g., polyamide), for example. The spacer structures 502 simultaneously serve as adhesive means for connecting the cover layer 401 to the sensor 500. Therefore, the cover layer 401 and the adhesive layer 402 are combined in one layer. As a result of the combination of layers, the apparatus for the direct optical recording of security-related objects 101 can be configured even more compactly. The adhesive layer 402 is formed in such a way that adhesive means are provided only in areas through which no illumination light 201 impinges on the light-sensitive elements 303 of the sensor pixels 307. The adhesive means simultaneously serve as spacer structures 502.

Some beam paths of the light coming from the placement surface 102 are further shown schematically in FIG. 3. In contrast to the embodiment shown in FIG. 1b, the spacer structures 502 are not transparent in this instance.

Figure 4:
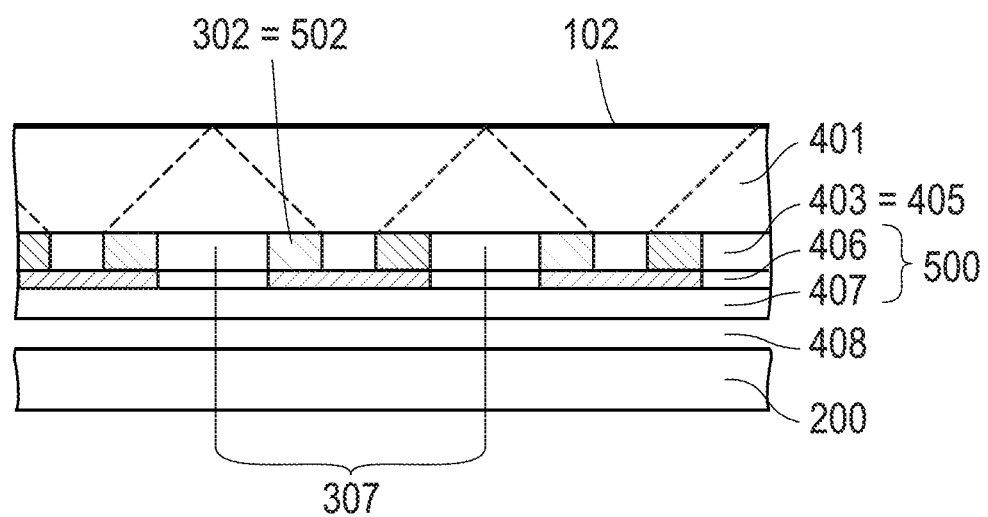
FIG. 4 a sectional view of a sixth embodiment of the apparatus for the direct optical recording of security-related objects.

FIG. 4 shows a sixth embodiment of the apparatus for the direct optical recording of security-related objects 101. The series of layers comprises the cover layer 401 with the placement surface 102, the spacer layer 403 with spacer structures 502, a diode aperture layer 405 with diode apertures 302, the sensor layer 406 with the sensor pixels 307, the spacer layer 403 with the spacer structures 502, and the substrate 407. The spacer layer 403 is produced by spacer structures 502 formed from existing raised shaped function elements of the sensor layer 406, and the function elements of the sensor layer 406 are the diode apertures 302. Accordingly, the spacer layer 403 and the diode aperture layer 405 are combined in one layer.

Figure 5A:
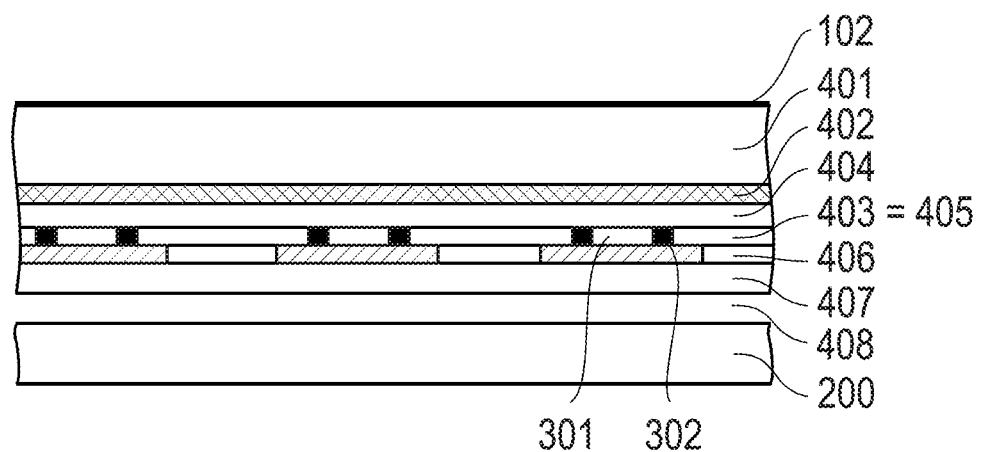
FIG. 5a a sectional side view of a seventh embodiment of the apparatus for the direct optical recording of security-related objects.

FIG. 5a shows a seventh embodiment of the apparatus for the direct optical recording of security-related objects 101. The series of layers comprises the cover layer 401 with the placement surface 102, the adhesive layer 402, the passivation layer 404, the spacer layer 403 with the spacer structures 502, the diode aperture layer 405 with the diode apertures 302, the sensor layer 406 with the sensor pixels 307, the spacer layer 403 with the spacer structures 502, and the substrate 407. The illumination layer 200 is arranged below the air layer 408 viewed from the placement surface 102. The spacer layer 403 is produced by spacer structures 502 formed from existing raised shaped function elements of the sensor layer 406, and the function elements of the sensor layer 406 are the diode apertures 302. The spacer layer 403 and the diode aperture layer 405 are accordingly combined in one layer.

Figure 5B:
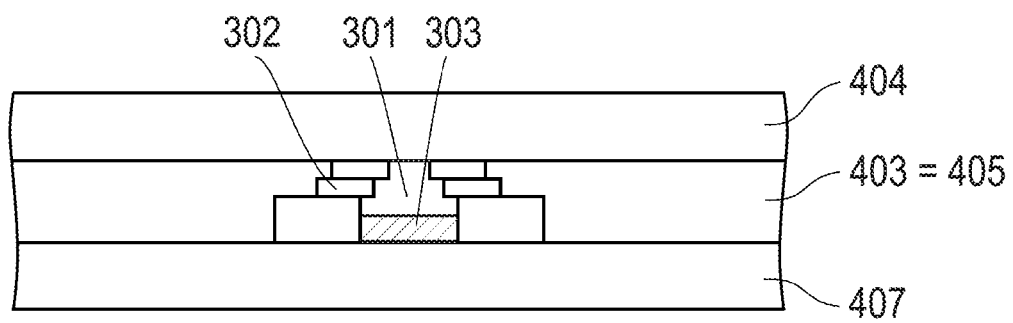
FIG. 5b a sectional side view of an advantageous construction of a sensor pixel with a diode aperture.

FIG. 5b shows the structure of a diode aperture 302 by way of example. The diode aperture 302 is shaped raised and stepped and encloses a gas or a gas mixture, advantageously air. The passivation layer 404 terminates the diode aperture 302 upward in direction of the cover surface 102.

FIGS. 6a-f show various embodiment examples of the arrangement of sensor pixels 307 and spacer structures 502. Only the spacer layer 403 and the sensor layer 406 are shown. The sensor pixels 307 are arranged in a grid shape in all of the depicted embodiment examples.

Figures 6A, 6B:
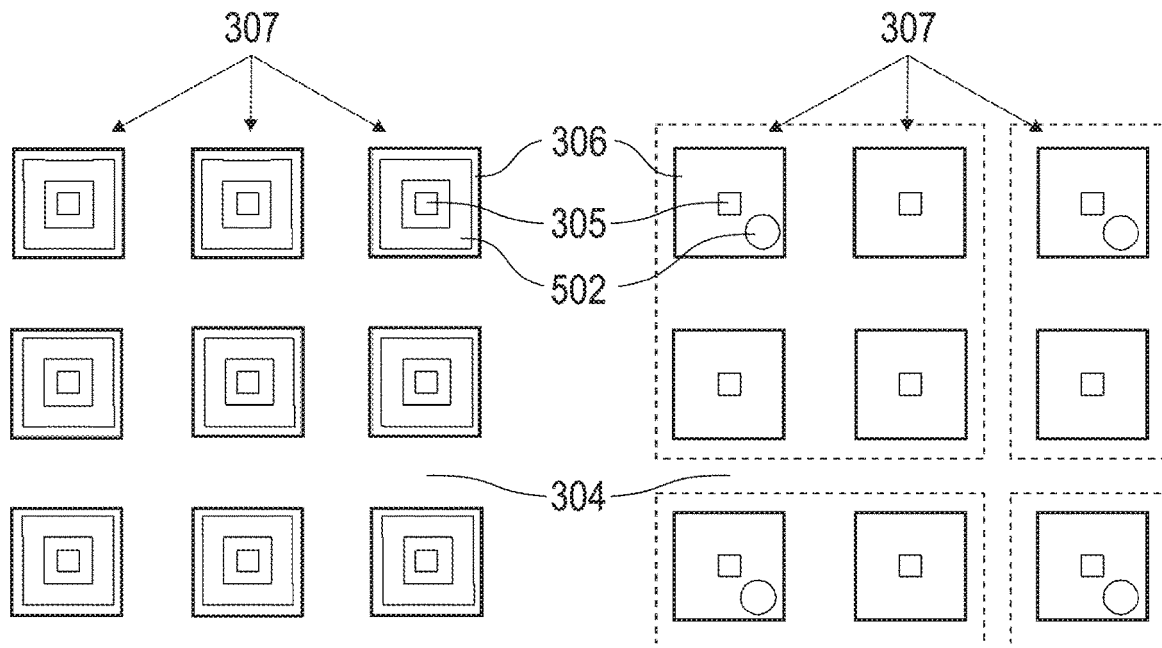
FIGS. 6a-f top views of various embodiment examples of the arrangement of sensor pixels and spacer structures by forming a spacer layer by means of function elements of the sensor layer and separated spacer layer.

In FIG. 6a, active sensor pixel surfaces 305 are arranged in each instance to be centered on opaque sensor pixel surfaces 306. The spacer structures 502 are arranged rectangularly on the opaque sensor pixel surface 306, respectively, around the active sensor pixel surface 305. The spacer structures 502 can simultaneously serve as diode apertures 302. The passage regions 304 are located between the opaque sensor pixel surfaces 306.

FIG. 6b shows an embodiment example in which a plurality of sensor pixels 307 are associated with a spacer structure 502. The association of the sensor pixels 307 with the spacer structures 502 is indicated by dashed lines in FIG. 6b and the following figures. The spacer layer 403 is produced by advantageously transparent spacer structures 502 additionally provided on the sensor layer 406. The spacer structures 502 are cylindrical in this embodiment example.

FIGS. 6c to 6f also show embodiment examples in which a plurality of sensor pixels 307 are associated with a spacer structure 502.

Figures 6C, 6D:
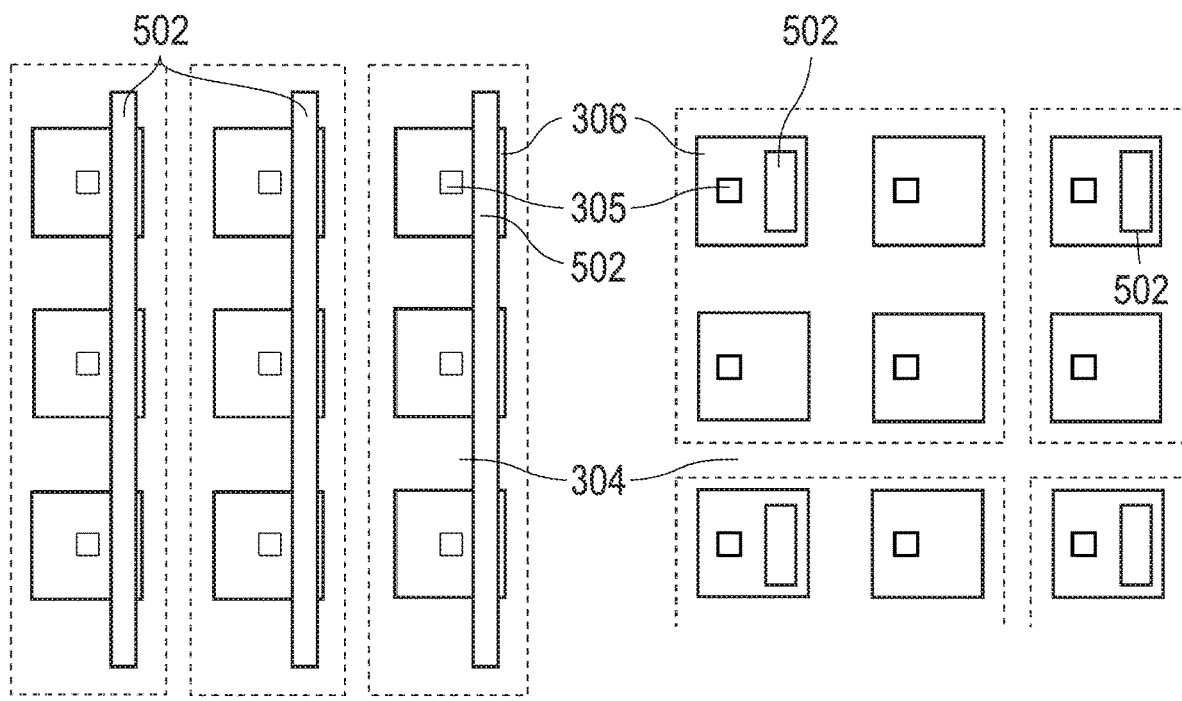

FIG. 6c shows parallelepipedal spacer structures 502. The spacer structures 502 extend over a plurality of sensor pixels 307.

Similar to FIG. 6b, a plurality of sensor pixels 307 are associated with a spacer structure 502 in the embodiment example depicted in FIG. 6d. However, the spacer structures 502 have a parallelepipedal shape.

Figure 6E:
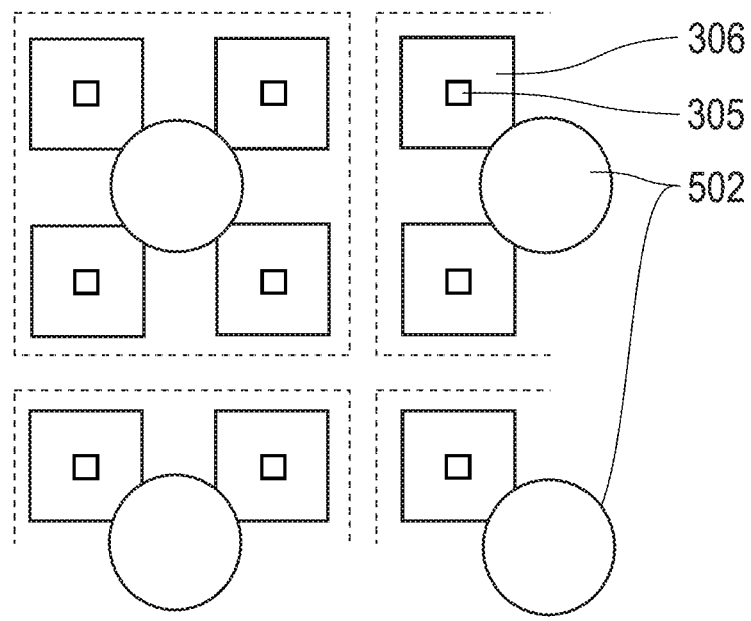

FIG. 6e shows an embodiment example in which cylindrical spacer structures 502 are provided as in FIG. 6b. The spacer structures 502 are arranged, respectively, between two columns and two rows of sensor pixels 307. It is not compulsory that the spacer structures 502 be arranged between all of the columns and rows of the sensor pixels 307; rather, they can also skip over columns and/or rows.

Figure 6F:
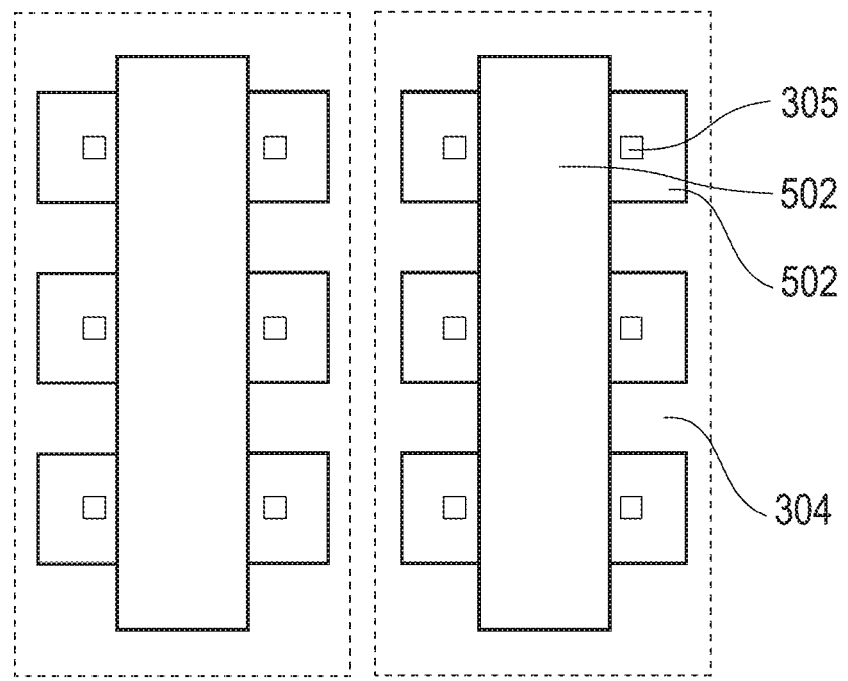

The embodiment example in FIG. 6f shows a similar arrangement in which parallelepipedal spacer structures 502 are arranged, respectively, between two columns of sensor pixels 307. The spacer structures 502 are not arranged between all of the columns of sensor pixels 307 but rather can also skip over columns.

It is possible that a spacer layer 403 has differently constructed spacer structures 502. It is also possible that a plurality of spacer structures 502 are associated with one sensor pixel 307.

REFERENCE NUMERALS 101 security-related object
102 placement surface
103 skin ridge (papillary ridge)
104 skin valley (papillary valley)
106 air gap (in skin valley, under document)
200 illumination layer
201 illumination light 202 scatter light
203 illumination element
204 direct back-reflection
301 cutout
302 diode aperture
303 light-sensitive element
304 passage region
305 active sensor pixel surface
306 opaque sensor pixel surface
307 sensor pixel
308 entrance aperture
401 cover layer
402 adhesive layer
403 spacer layer
404 passivation layer
405 diode aperture layer
406 sensor layer
407 substrate
408 air layer
409 filter layer
500 sensor
501 adhesive frame
502 spacer structure

The invention claimed is:

1. An apparatus for the direct optical recording of security-related objects, such as at least skin prints, comprising:
    a series of layers, including:
        a cover layer with a placement surface for the security-related object,
        a sensor layer having sensor pixels which are arranged in a two-dimensional grid and have in each instance a light-sensitive element, wherein the light-sensitive elements have entrance apertures which are positioned in a plane and which are receptive only to light coming from direction of the placement surface,
        a spacer layer with spacer structures in order to limit light incident from the placement surface to small incident angles on the sensor layer, and
    a substrate as carrier of the series of layers,
    wherein a spacer structure is associated with each sensor pixel,
    wherein the spacer layer is produced by spacer structures which are additionally provided on the sensor layer or by spacer structures formed from existing raised shaped function elements of the sensor layer with a defined thickness, and the spacer layer comprises, at least in the region of the entrance aperture of every light-sensitive element, a cutout of the spacer structures which is to be filled with a medium which has a refractive index substantially lower than that of the sensor layer and a layer adjoining in a direction of the placement surface, and an illumination layer for emitting illumination light which is arranged below a plane of the entrance apertures of the light-sensitive elements of the sensor layer considered from a direction of the placement surface.

2. The apparatus according to claim 1 wherein the illumination layer is arranged below the sensor layer, and an air layer is located between the illumination layer and the sensor layer.

3. The apparatus according to claim 1, wherein the illumination layer has illumination elements which are integrated between the light-sensitive elements in the sensor layer.

4. The apparatus according to claim 1, wherein the spacer layer is produced by spacer structures from existing raised shaped function elements of the sensor layer by diode apertures or electronic structures of the sensor layer.

5. The apparatus according to claim 1, wherein the spacer layer is produced by transparent spacer structures provided on the sensor layer.

6. The apparatus according to claim 1, wherein the cutouts between the spacer structures of the spacer layer are filled or evacuated with a gas or a gas mixture.

7. The apparatus according to claim 6, wherein the spacer layer is filled with at least one gas from the group comprising nitrogen, oxygen, helium, argon or a gas mixture having at least one of nitrogen, oxygen, helium, argon gas.

8. The apparatus according to claim 1, wherein a filter layer is provided between the placement surface and the sensor layer in order to block ambient light reaching the placement surface next to or through a finger.

9. The apparatus according to claim 1, wherein a connection of the cover layer to a sensor comprising sensor layer and substrate is produced by vacuum bonding.

10. The apparatus according to claim 1, wherein a connection of the cover layer to a sensor comprising sensor layer and substrate is produced by an adhesive layer.

11. The apparatus according to claim 1, wherein a connection of the cover layer to a sensor comprising sensor layer and substrate is produced by an adhesive frame through air gap bonding.

* * * * *